United States Patent
Kim et al.

(10) Patent No.: US 11,209,940 B2
(45) Date of Patent: Dec. 28, 2021

(54) TOUCH SENSOR (71) Applicant: Samsung Display Co., Ltd., Yongin-Si (KR)

(72) Inventors: Chang Bum Kim, Yongin-si (KR); Jung Mok Park, Yongin-si (KR); Young Sik Kim, Yongin-si (KR); Choon Hyop Lee, Yongin-si (KR); Byeong Kyu Jeon, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/226,492

(22) Filed: Dec. 19, 2018

(65) Prior Publication Data

US 2019/0278398 A1 Sep. 12, 2019

(30) Foreign Application Priority Data

Mar. 6, 2018 (KR) .......................... 10-2018-0026212

(51) Int. Cl.
*G06F 3/044* (2006.01)

(52) U.S. Cl.
CPC .................................. *G06F 3/044* (2013.01)

(58) Field of Classification Search
None
See application file for complete search history.

(56) References Cited

U.S. PATENT DOCUMENTS

| | | | |
|---|---|---|---|
| 8,542,331 B2 | 9/2013 | Yoon et al. | |
| 9,202,408 B2 * | 12/2015 | Choi | G09G 3/32 |
| 9,721,914 B2 | 8/2017 | Kang | |
| 9,864,474 B2 * | 1/2018 | Hayashi | G06F 3/045 |
| 2011/0134055 A1 * | 6/2011 | Jung | G06F 3/044 345/173 |
| 2014/0340597 A1 | 11/2014 | Sato | |
| 2014/0368755 A1 * | 12/2014 | Chen | G06F 3/044 349/12 |
| 2017/0153747 A1 * | 6/2017 | Yoon | G06F 3/0412 |
| 2018/0053810 A1 * | 2/2018 | Jin | G06F 3/0416 |
| 2018/0164913 A1 * | 6/2018 | Choi | G06F 3/0416 |
| 2018/0182818 A1 * | 6/2018 | Kim | H01L 27/322 |
| 2018/0224988 A1 * | 8/2018 | Lee | G06F 3/044 |
| 2018/0314098 A1 * | 11/2018 | Saitoh | G02F 1/1333 |

(Continued)

FOREIGN PATENT DOCUMENTS

| | | | |
|---|---|---|---|
| JP | 2012045216 | * | 3/2013 |
| JP | 2013156773 | * | 7/2013 |

(Continued)

*Primary Examiner* — Chad M Dicke
(74) *Attorney, Agent, or Firm* — Innovation Counsel LLP (57) ABSTRACT

A touch sensor includes a substrate, a touch input unit, a plurality of wires, and a pad unit. The touch input unit is disposed on the substrate and includes a plurality of sensing electrodes for sensing user touch. The pad unit includes a plurality of pads electrically connected to the sensing electrodes through the wires. The pads include a first pad. The first pad includes a first conductive film disposed on the substrate, an insulating film disposed on the first conductive film, and a second conductive film disposed on the insulating film. The insulating film includes a plurality of first-type holes and a plurality of second-type holes. Each first-type hole of the first-type holes is smaller than each second-type hole of the second-type holes.

17 Claims, 7 Drawing Sheets

(56) References Cited

U.S. PATENT DOCUMENTS

2018/0348918 A1* 12/2018 Rhe ...................... H01L 27/323
2020/0026384 A1* 1/2020 Rhe ...................... G06F 3/0443

FOREIGN PATENT DOCUMENTS

| | | | |
|---|---|---|---|
| JP | 2013156773 | * | 8/2013 |
| KR | 20120076065 | * | 7/2012 |
| KR | 20150060049 | * | 6/2015 |
| KR | 10-1574600 B1 | | 12/2015 |
| KR | 10-2016-0078747 A | | 7/2016 |
| KR | 10-1682755 B1 | | 12/2016 |
| KR | 10-1856220 B1 | | 5/2018 |

* cited by examiner

TOUCH SENSOR

CROSS-REFERENCE TO RELATED APPLICATION

This application claims priority to Korean Patent Application No. 10-2018-0026212, filed on Mar. 6, 2018, in the Korean Intellectual Property Office; the Korean Patent Application is incorporated by reference herein in its entirety.

BACKGROUND

1. Technical Field

The technical field relates to a touch sensor.

2. Related Art

A touch sensor is an input device for inputting a command of a user by detecting a touch by a human hand or an object. A touch sensor may be provided on the front face or the inside of an image display device and may convert a touch/contact position into an electrical signal. The electrical signal may be used for controlling operations of the image display device.

SUMMARY

Embodiments may be related a touch sensor having a structure that prevents cracks in a pad unit and improves contact resistance.

A touch sensor according to an embodiment includes: a substrate including a sensing area and a non-sensing area disposed adjacent to the sensing area; a touch input unit disposed in the sensing area and including a plurality of sensing electrodes arranged in a first direction and a second direction intersecting with each other; and a pad unit disposed in the non-sensing area and including a plurality of pads connected to the sensing electrodes through wirings, wherein the pads include a first conductive film disposed on the substrate, an insulating film disposed on the first conductive film and including a plurality of first holes and second holes having different areas, and a second conductive film disposed on the insulating film.

An area of the first holes may be smaller than an area of the second holes and the distance between the first holes and the sensing area may be greater than the distance between the second holes and the sensing area.

The area of the second holes may be at least twice the area of the first holes.

The touch sensor may further include a plurality of third holes provided between the first holes and the second holes and having an area different from the areas of the first holes and the second holes.

The area of the third holes may be greater than the area of the first holes and smaller than the area of the second holes.

The first holes and the second holes may have at least one of polygonal shape, circular shape, and elliptical shape.

The first conductive film may be a metal layer, and the second conductive film may be a transparent conductive film.

A touch sensor according to an embodiment includes: a substrate including a sensing area and a non-sensing area disposed adjacent to the sensing area; a touch input unit disposed in the sensing area and including a plurality of sensing electrodes arranged in a first direction and a second direction intersecting with each other; and a pad unit disposed in the non-sensing area and including a plurality of pads connected to the sensing electrodes through wirings, wherein the pads include a first conductive film disposed on the substrate and being a metal layer, an insulating film disposed on the first conductive film and including a plurality of first holes and second holes having different areas, and a second conductive film disposed on the insulating film and being a transparent conductive film, and wherein the area of the first holes is smaller than the area of the second holes, and a distance between the first holes and the sensing area may be greater than a distance between the second holes and the sensing area.

The touch sensor may further include a plurality of third holes provided between the first holes and the second holes and having an area different from the areas of the first holes and the second holes.

The area of the third holes may be greater than the area of the first holes and smaller than the area of the second holes.

An embodiment may be related to a touch sensor. The touch sensor may include a substrate, a touch input unit, a plurality of wires, and a pad unit. The touch input unit may be disposed on the substrate and may include a plurality of sensing electrodes for sensing user touch. The pad unit may include a plurality of pads electrically connected to the sensing electrodes through the wires. The pads may include a first pad. The first pad may include a first conductive film disposed on the substrate, an insulating film disposed on the first conductive film, and a second conductive film disposed on the insulating film. The insulating film may include a plurality of first-type holes and a plurality of second-type holes. Each first-type hole of the first-type holes may be smaller than each second-type hole of the second-type holes.

A minimum distance between the plurality of first-type holes and the plurality of sensing electrodes may be greater than a minimum distance between the plurality of second-type holes and the plurality of sensing electrodes.

A size of each second-type hole may be at least twice a size of each first-type hole.

The insulating film may include a plurality of third-type holes provided between the plurality of first-type holes and the plurality of second-type holes. A size of each third-type hole of the third-type holes may be unequal to a size of each first-type hole and may be unequal to a size of each second-type hole.

Each third-type hole may be larger than each first-type hole and smaller than each second-type hole.

The first-type holes and the second-type holes have at least one of a polygonal shape, a circular shape, and an elliptical shape.

The first conductive film may be a metal layer. The second conductive film may be a transparent conductive film.

An embodiment may be related to a touch sensor. The touch sensor may include the following elements: a substrate; a touch input unit disposed on the substrate and including a plurality of sensing electrodes for sensing user touch; a plurality of wires; and a pad unit including a plurality of pads electrically connected to the sensing electrodes through the wires. The pads may include a first pad. The first pad may include a metal conductive film disposed on the substrate, an insulating film disposed on the metal conductive film, and a transparent conductive film disposed on the insulating film. The insulating film may include a first-type hole and a second-type hole. The first-type hole may be smaller than the second-type hole in a plan view of the touch sensor. A minimum distance between the first-type hole and the plurality of sensing electrodes may be greater than a minimum distance between the second-type hole and the plurality of sensing electrodes.

The insulating film may include a third-type hole provided between the first-type hole and the second-type hole. A size of the third-type hole may be unequal to a size of the first-type hole and may be unequal to a size of the second-type hole.

The third-type hole may be larger than the first-type hole and smaller than the second-type hole in the plan view of the touch sensor.

DETAILED DESCRIPTION

Example embodiments are described with reference to the figures. However, practical embodiments are not limited to the described embodiments, but include all modifications, equivalents, and alternatives.

Same reference numbers may be used for similar components. In the accompanying drawings, the dimensions of structures may be shown enlarged than actual for clarity. Although the terms of first, second, and the like may be used to describe various components, the components should not be limited by the terms. The terms are used for the purpose of distinguishing one component from another. For example, the first component may be referred to as a second component, and similarly, the second component may also be referred to as a first component. The terms "first," "second," etc. may also be used herein to differentiate different categories or sets of elements. For conciseness, the terms "first," "second," etc. may represent "first-type (or first-set)," "second-type (or second-set)," etc., respectively. The singular forms may include plural forms unless the context clearly dictates otherwise.

In this application, the terms of "comprise", "include" or "have", or the like may specify the presence of stated features, numbers, steps, operations, components, parts or combinations thereof, and do not preclude the possibility of the presence or addition of one or more other features, numbers, steps, operations, components, parts, or combinations thereof. When a first element is "on" a second element, this may include not only a case where the first element is "directly on" the second element, but also a case where an intervening element is present between the first element and the second element. When a first element is on a second element, the position of the first element is not limited to an upper direction but may include a side or a lower direction relative to the second element.

The term "connect" may mean "electrically connect"; the term "insulate" may mean "electrically insulate" or "electrically isolate."

Figure 1:
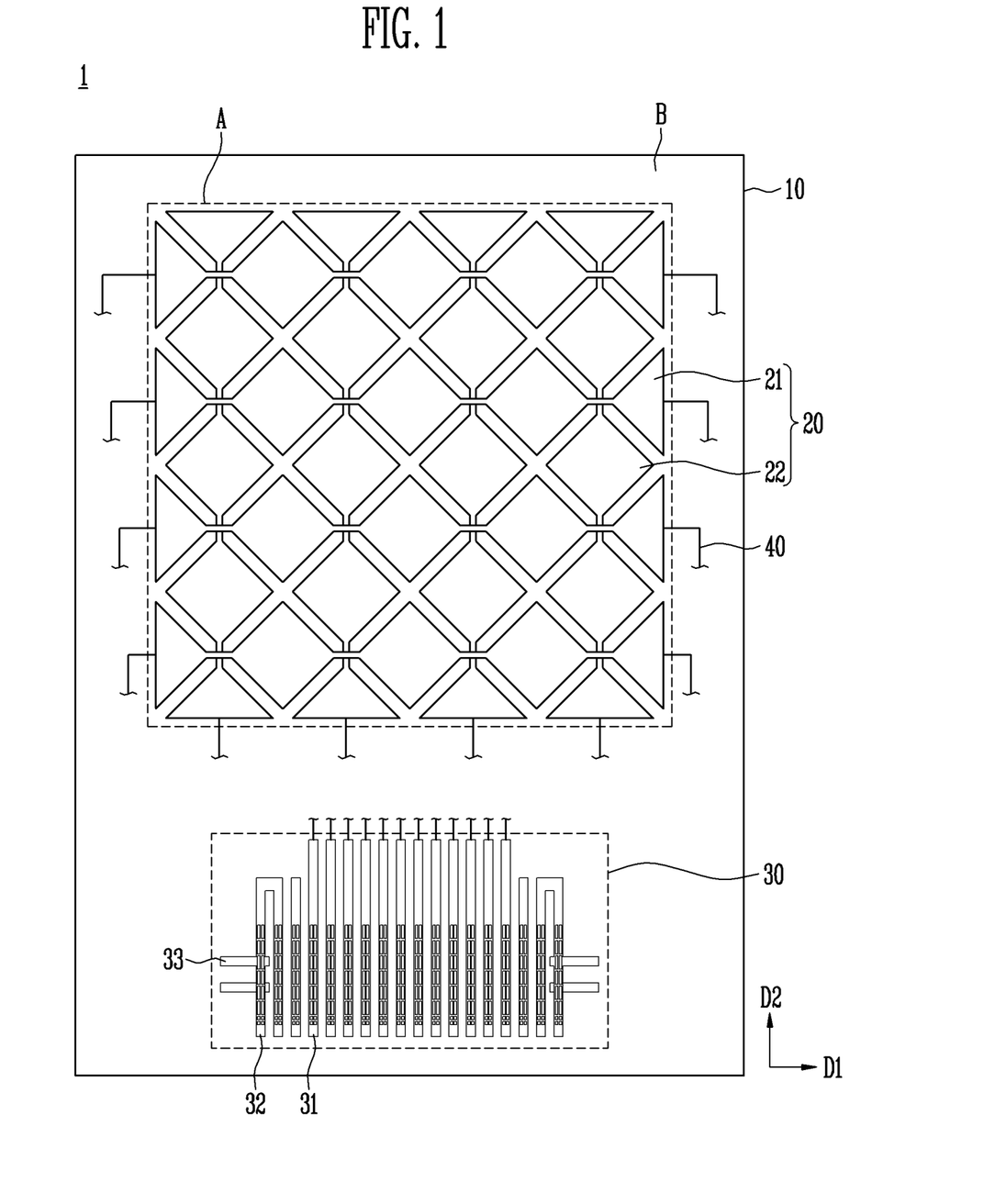
FIG. 1 is a plan view of a touch sensor according to an embodiment.
Figure 2:
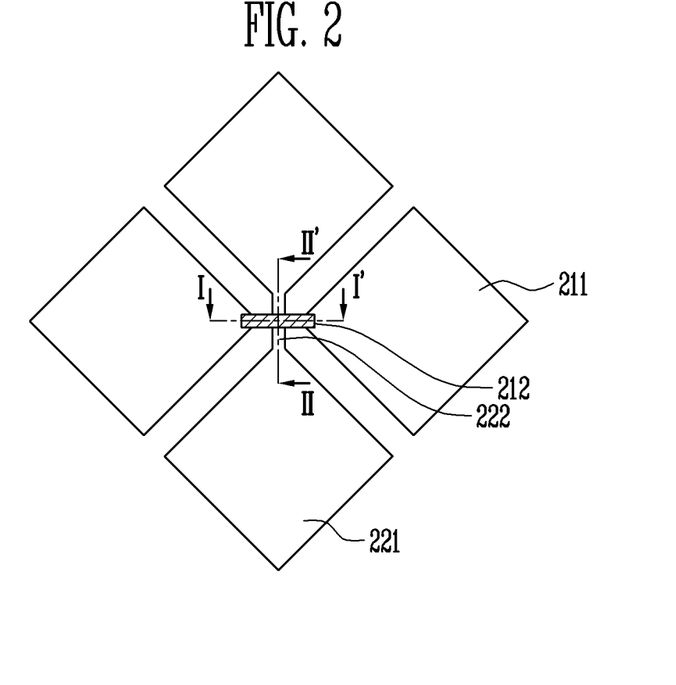
FIG. 2 is a plan view of sensing electrodes shown in FIG. 1 according to an embodiment.
Figure 3:
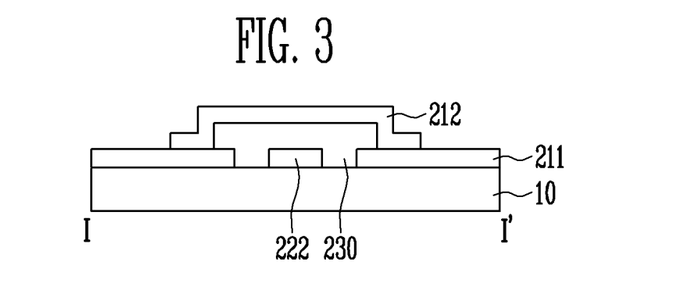
FIG. 3 is a cross-sectional view taken along the line I-I' in FIG. 2 according to an embodiment.
Figure 4:
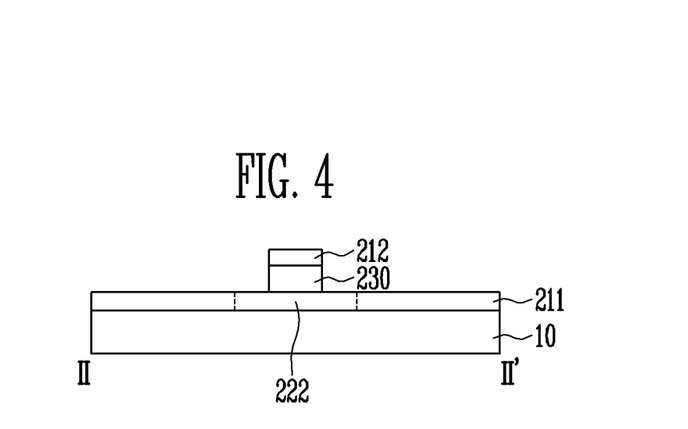
FIG. 4 is a cross-sectional view taken along the line II-II' in FIG. 2 according to an embodiment.

FIG. 1 is a plan view of a touch sensor 1 according to an embodiment, FIG. 2 is a plan view of sensing electrodes shown in FIG. 1, and FIGS. 3 and 4 are cross-sectional views taken along the line I-I' and the line II-II' of FIG. 2, respectively, according to one or more embodiments.

Referring to FIG. 1, the touch sensor 1 may include a substrate 10, a touch input unit 20, and a pad unit 30.

The substrate 10 may include a transparent insulating material.

The substrate 10 may be formed of a flexible material, for example, a film or a plastic material including a polymer organic material. For example, the flexible material may include one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP).

The substrate 10 may be formed of a rigid material, for example, glass, quartz, glass ceramic, or crystalline glass.

The substrate 10 may support and/or protect sensing electrodes 21 and 22 mechanically and chemically by preventing breakage of the sensing electrodes 21 and 22 of the touch input unit 20 and/or preventing penetration of moisture into the sensing electrodes 21 and 22.

The substrate 10 may have a flat surface, and may be formed in a polygonal shape, a circular shape, or an oval shape. The shape of the substrate 10 may be configured according to embodiments.

The substrate 10 may include a sensing area A where input information is detected and a non-sensing area B disposed adjacent to the sensing area A.

The touch input unit 20 may be disposed in the sensing area A. The touch input unit 20 may use a capacitance sensing as a position sensing method and may detect input information (input position coordinate information) corresponding to an input means from the surface of the substrate 10.

The touch input unit 20 may include the sensing electrodes 21 and 22 disposed on the substrate 10. The first sensing electrodes 21 extend in a first direction D1 and are arranged in a second direction D2 different from the first direction D1. The second sensing electrodes 22 are arranged in the first direction D1 and extend in the second direction D2. The first direction D1 and the second direction D2 may be orthogonal to each other. The capacitances sensed through the sensing electrodes 21 and 22 vary according to inputs provided by an input means such as a user's finger or a conductor.

Each first sensing electrode 21 may include a plurality of first sensing members 211 spaced apart from each other. The first sensing members 211 may be arranged in the first direction D1, and first sensing members 211 adjacent to each other may be electrically connected through a bridge member 212 provided in a layer different from the layer of the first sensing members 211. Each second sensing electrode 22 may include a plurality of second sensing members 221. The second sensing members 221 may be arranged in the second direction D2, and second sensing members 221 adjacent to each other may be electrically connected through a connecting member 222.

The first sensing members 211 and the second sensing members 221 are insulated from each other. As shown in FIG. 2, the first sensing pattern 211 and the second sensing pattern 221 may be spaced apart from each other. In addition, as shown in FIGS. 3 and 4, an insulating layer 230 may be disposed between the bridge pattern 212 and the connecting pattern 222.

One of the bridge pattern 212 and the connecting pattern 222, for example, the connecting pattern 222, may be provided on the same layer as the first sensing pattern 211 and the second sensing pattern 221, for example, on the substrate 10. The other one of the bridge pattern 212 and the connecting pattern 222, for example, the bridge pattern 212, may be provided on a different layer, for example, on the insulating layer 230.

The first sensing pattern 211, the second sensing pattern 221, the bridge pattern 212, and the connecting pattern 222 may be formed of a material having excellent electric conductivity, for example, molybdenum, silver, aluminum, copper, palladium, gold, platinum, zinc, tin, titanium, or an alloy of two or more of them. In an embodiment, the first sensing pattern 211, the second sensing pattern 221, the bridge pattern 212, and the connecting pattern 222 may be formed using a transparent electrode material known in the art, for example, indium tin oxide (ITO), indium zinc oxide (IZO), zinc oxide (ZnO), indium zinc tin oxide (IZTO), cadmium tin oxide (CTO), copper oxide (CO), poly (3,4-ethylenedioxythiophene) (PEDOT), carbon nanotube (CNT), graphene, or the like.

The pad unit 30 may be disposed in a portion of the non-sensing area B and include a plurality of bonding pads 31 connected to the sensing electrodes 21 and 22 through a plurality of wirings 40 (or wires 40). The Pad unit 30 may further include test pads 32 and alignment pads 33.

On the substrate 10, the plurality of wirings 40 are arranged outside the touch input unit 20. One end of a wiring 40 is connected to one of the first sensing electrodes 21 of the touch input unit 20, and the other end thereof is connected to one of the bonding pads 31 of the pad unit 30. Alternatively, one end of a wiring 40 is connected to one of the second sensing electrodes 22 of the touch input unit 20, and the other end thereof is connected to one of the bonding pads 31 of the pad unit 30. Information on the coordinates of the input position that the touch sensor 1 detects is output to the plurality of bonding pads 31 through the plurality of wirings 40.

Figure 5:
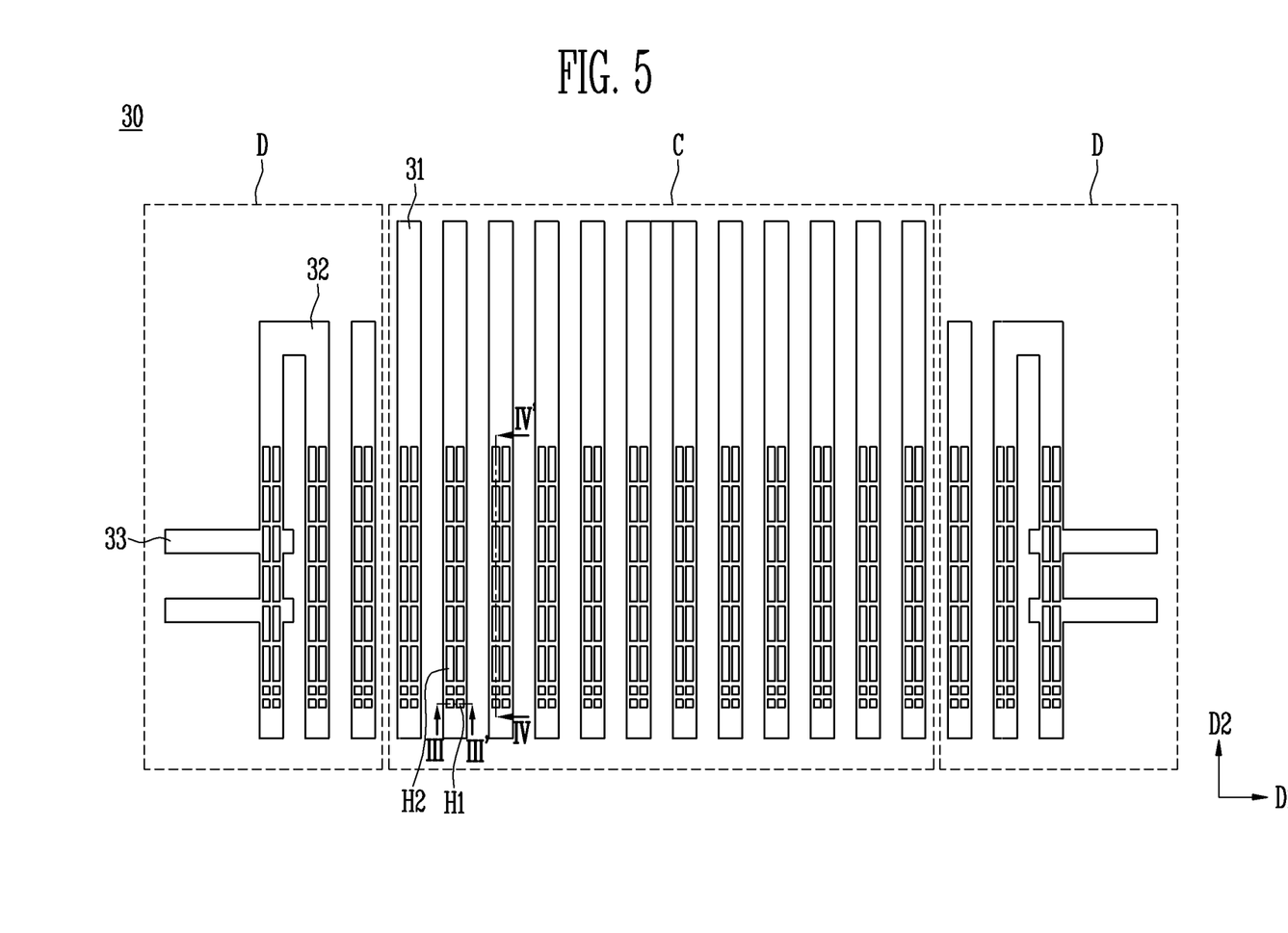
FIG. 5 is a plan view of a pad unit according to an embodiment.
Figure 6:
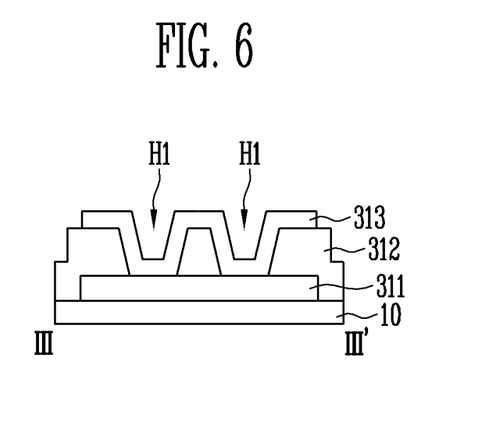
FIG. 6 is a cross-sectional view taken along the line III-III' in FIG. 5 according to an embodiment.
Figure 7:
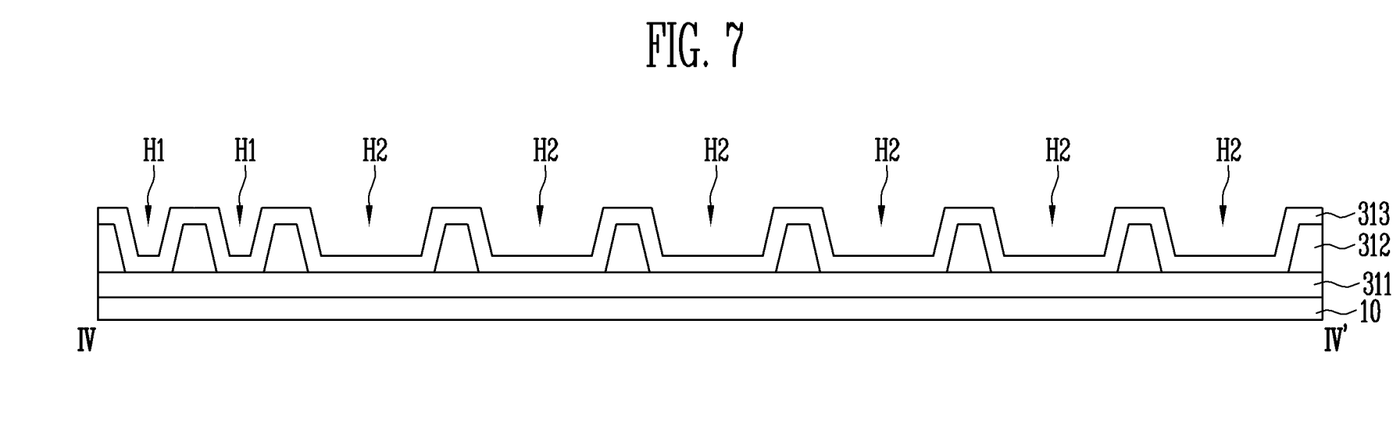
FIG. 7 is a cross-sectional view taken along the line IV-IV' in FIG. 5 according to an embodiment.

FIG. 5 is a plan view of the pad unit according to an embodiment, and FIGS. 6 and 7 are cross-sectional views taken along the lines III-III' and IV-IV' in FIG. 5, respectively, according to one or more embodiments.

Referring to FIG. 5, the pad unit 30 may include pads disposed in a bonding area C and a test area D.

The wiring 40 connecting the touch input unit 20 and the pad unit 30 may be connected to pads 31 in the bonding area C, and pads 31 in the bonding area C may be connected to a printed circuit board (PCB) including an external driving circuit. When a human hand or an object (e.g., a conductive object) contacts the touch sensor, a change in capacitance according to the contact position may be transmitted to the driving circuit through the first sensing electrode 21, the second sensing electrode 22, the wiring 40, and the pads 31.

In the bonding area C, a plurality of bonding pads 31 may be provided. Each bonding pad 31 may extend in the second direction D2 and may be arranged in the first direction D1 while maintaining mutual spacing between adjacent pads.

In the test area D, the test pads 32 may be provided. The test pad 32 may provide information on the degree of bonding of the PCB to the pad unit 30, information on the resistance of the bonding pad 31, information as to whether the anisotropic conductive film (ACF) conductive balls are in operation, and the like.

In the test area D, the alignment pads 33 may be further provided. The alignment pads 33 may prevent the connection between a pad attaching unit of the PCB and the test pads 32 from being shifted. When the pad attaching unit of the PCB is connected to the test pads 32 of the test area D, the pad attaching unit of the PCB may be connected to the test pads 32 without being misaligned from the test pads 32 with reference to the alignment pads 33.

As shown in FIG. 6, a bonding pad 31 includes a first conductive film 311 disposed on the substrate 10, an insulating film 312 disposed on the first conductive film 311 and including a plurality of first holes H1 and second holes H2 having different sizes (e.g., different areas and/or different lengths in a plan view of the bonding pad 31 or of the touch sensor 1), and a second conductive film 313 disposed on the insulating film 312.

The first conductive film 311 is formed on the substrate 10. The first conductive film 311 may be formed using a material having excellent electric conductivity. The first conductive film 311 may be a metal layer, for example, a layer formed using molybdenum, silver, aluminum, copper, palladium, gold, platinum, zinc, tin, titanium or an alloy of two or more of them, or a transparent conductive film, for example, a layer formed using indium tin oxide (ITO), indium zinc oxide (IZO), zinc oxide (ZnO), indium zinc tin oxide (IZTO), cadmium tin oxide (CTO), copper oxide (CO), PEDOT, carbon nanotube (CNT), graphene, or the like, preferably a metal layer.

The insulating film 312 may be formed on exposed portions of the substrate 10 and on the first conductive film 311. The insulating film 312 includes the holes H1 and H2 that expose the first conductive film 311. For example, the insulating film 312 may include the plurality of first holes H1 and second holes H2 having different sizes (e.g., top/bottom areas).

The insulating film 312 may be formed using an inorganic insulating material, for example, silicon oxide (SiOx), silicon nitride (SiNx). Alternatively or additionally, the insulating film 312 may be formed using an organic insulating material, for example, polyimide or acrylic resin.

The insulating film 312 includes the first holes H1 and the second holes H2 may substantially prevent occurrence of cracks in the pad unit 30, specifically, in the bonding pad 31 and the test pad by accommodating pressure during outer shape processing of a lower part of the pad unit 30 of the touch sensor. If insulating film 312 is continuously formed without the holes, pressure may accumulate and may cause cracks in the bonding pads.

The second conductive film 313 may be formed on the insulating film 312. The second conductive film 313 may be connected to the first conductive film 311 through the holes H1 and H2. As with the first conductive film 311, the second conductive film 313 may be formed using a material having excellent electrical conductivity. The second conductive film 313, for example, may be a metal layer, for example, a layer formed using molybdenum, silver, aluminum, copper, palladium, gold, platinum, zinc, tin, or an alloy of two or more of them, or a transparent conductive film, for example, a layer formed using indium tin oxide (ITO), indium zinc oxide (IZO), zinc oxide (ZnO), indium zinc tin oxide (IZTO), cadmium tin oxide (CTO), copper oxide (CO), PEDOT, carbon nanotube (CNT), graphene, or the like, preferably a transparent conductive film. The second conductive film 313 may be formed simultaneously with the first sensing electrode 21, the second sensing electrode 22, and/or connecting wirings 40.

The test pad 32 and the alignment pad 33 may have substantially the same lamination structure of the bonding pad 31. The holes formed in the insulating film 312 may prevent cracks in the bonding pad 31, the test pad 32, and the like during outer shape processing of the touch sensor 1. However, if the sizes of the holes are all equal for all bonding pads 31 and all test pads 32, a contact area between the first conductive film 311 and the second conductive film 313 may not be sufficient, and the contact resistance may be undesirably excessive. According to embodiments, the insulating film 312 includes holes having different sizes, thereby ensuring a sufficient contact area between the first conductive film 311 and the second conductive film 313.

The plurality of holes having different sizes (e.g., different areas in a plan view). The size (e.g., area) of each first hole H1 may be smaller than the size (e.g., area) of each second hole H2. In an embodiment, the bottom/top area of each second hole H2 may be at least twice the bottom/top area of each first hole H1. As shown in FIG. 7, in an embodiment in which the width of a hole H1 and the width of a hole H2 are equal to each other, the area of the hole H1 and the area of the hole H2 are unequal according to the length of the hole H1 and the length of the H2. The areas of the holes H1 and H2 may be configured according to embodiments.

The minimum distance between the first holes H1 and the touch input unit 20 (or the sensing area A) may be greater than the minimum distance between the second holes H2 and the touch input unit 20 (or the sensing area A). That is, holes near an edge of the touch sensor 1 (e.g., near the lower edge portion of the pad unit 30 or the lower edge of the substrate 10) may be smaller than other holes.

The holes H1 and H2 may have at least one of a polygonal shape, a circular shape, and an elliptical shape.

Figure 8:
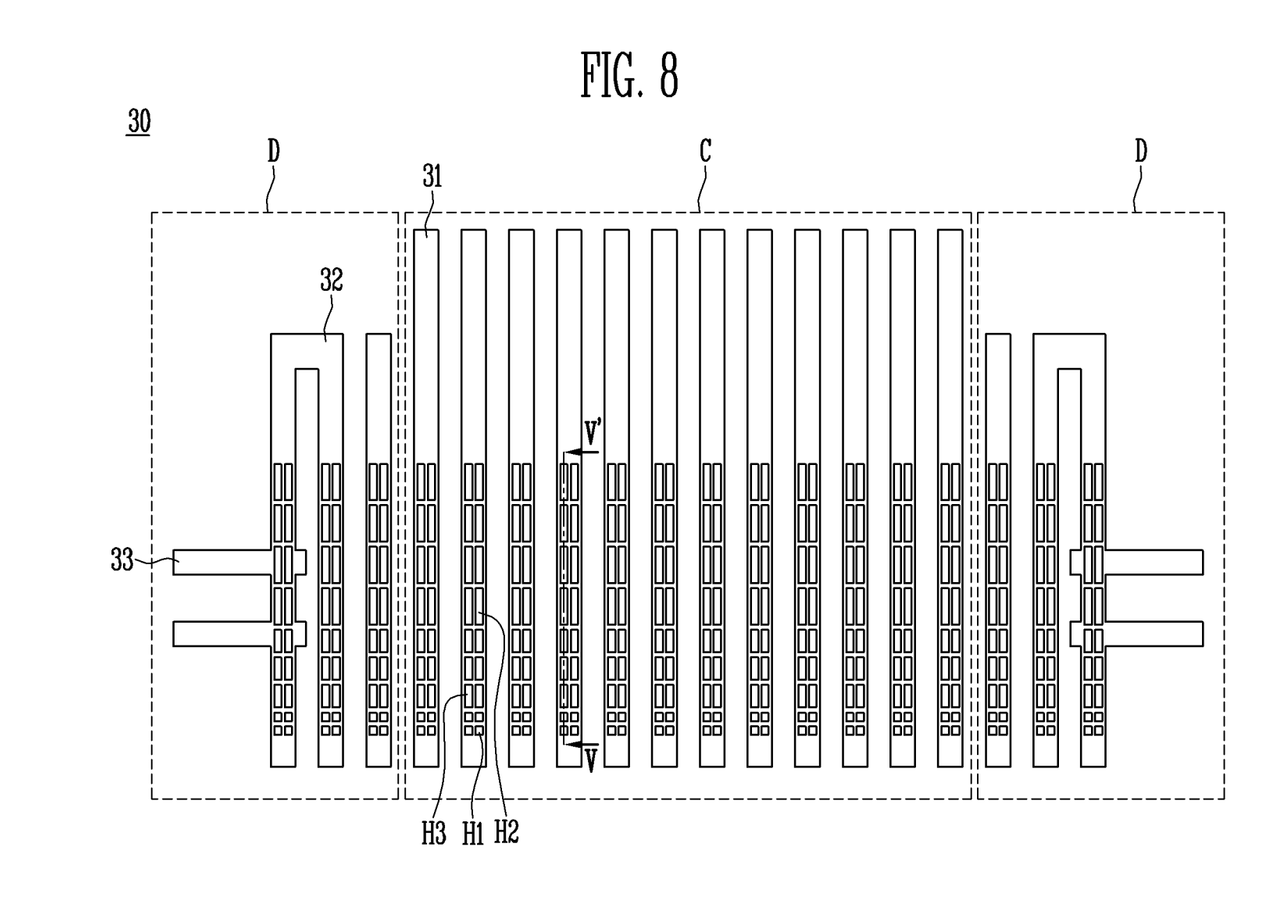
FIG. 8 is a plan view of a pad unit according to an embodiment.
Figure 9:
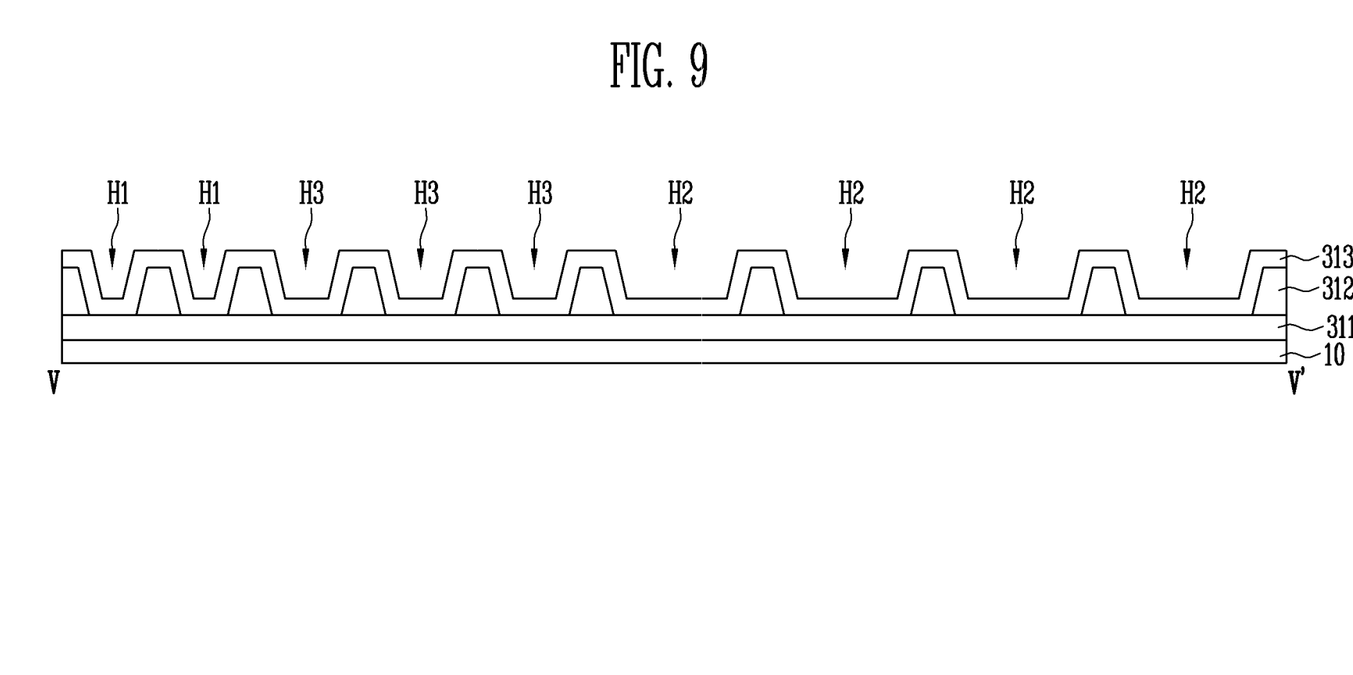
FIG. 9 is a cross-sectional view taken along the line V-V' in FIG. 8 according to an embodiment.
Figure 10A:
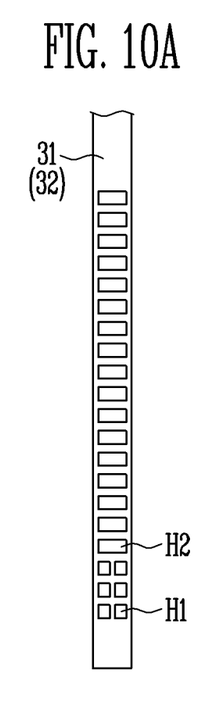
FIG. 10A, FIG. 10B, FIG. 10C, FIG. 10D, FIG. 10E, and FIG. 10F are plan views of bonding pads according to one or more embodiments.
Figure 10B:
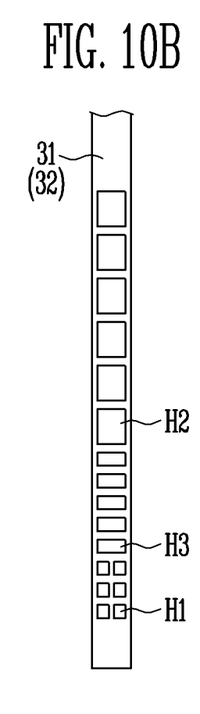
Figure 10C:
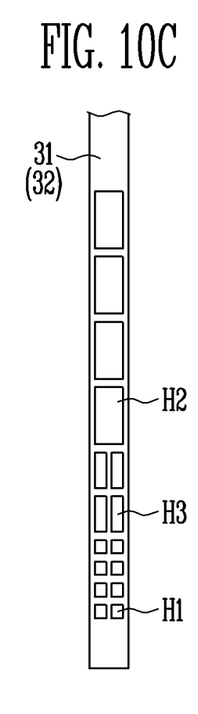
Figure 10D:
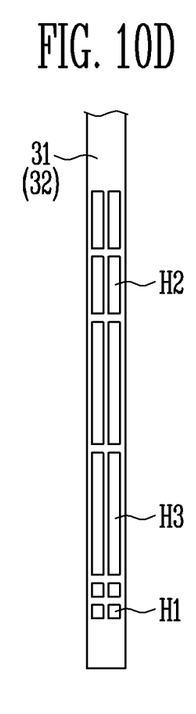
Figure 10E:
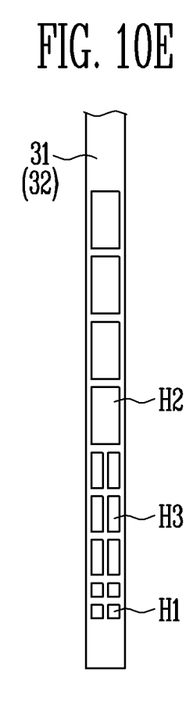
Figure 10F:
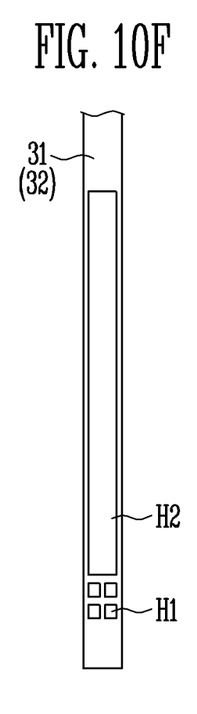

FIG. 8 is a plan view of a pad unit according to an embodiment, and FIG. 9 is a cross-sectional view taken along the line V-V' in FIG. 8 according to an embodiment.

Identical or analogous elements and/or structures shown in FIGS. 5 and 7 are denoted by same reference numerals. Elements and/or structures of the pad unit 30 shown in FIGS. 8 and 9 but not shown in FIGS. 5 and 7 are described below.

Referring to FIGS. 8 and 9, a plurality of holes having different sizes/areas, e.g., first holes H1, second holes H2, and third holes H3 provided between the first holes H1 and the second holes H2 may be provided in the insulating film 312 of the bonding pad 31. The size/area of a first hole H1 may be smaller than the size/area of a second holes H2, and the size/area of a third holes H3 may be greater than the size/area of the first hole H1 and smaller than the size/area of the second hole H2. That is, the sizes/areas of the first to third holes H1 to H3 may decrease as these holes are closer to the lower edge of the pad unit 30 or the lower edge of the substrate 10. In an embodiment, the size/area of each second hole H2 and the size/area of each third hole H3 may each be at least twice the size/area of each first hole H1. As shown in FIG. 9, according to an embodiment in which the widths of the holes H1, H2 and H3 are equal to one another, the bottom/top area of each second hole H2 and the bottom/top area of each third hole H3 are each at least twice the bottom/top area of each first hole H1 according to the lengths of the holes H1, H2 and H3. The areas of the holes H1, H2, and H3 may be configured according to embodiments.

The holes H1, H2, and H3 may have at least one of a polygonal shape, a circular shape, and an elliptical shape.

FIGS. 10A to 10F are plan views of bonding pads according to one or more embodiments.

Identical or analogous elements and/or structures shown in FIGS. 5, 8, 10A, 10B, 10C, 10D, 10E, and 10F are denoted by same reference numerals. Elements and/or structures of the bonding pad 31 or the test pad 32 shown in FIGS. 10(A) to 10(F) but not shown in FIGS. 5 and 8 are described below.

Referring to FIGS. 10A to 10F, a plurality of holes having different sizes/areas, e.g., first holes H1 and second hole(s) H2 may be provided in the insulating film 312 of the bonding pad 31, and optionally/selectively, third holes H3 may be provided between the first holes H1 and the second hole(s) H2.

The sizes/areas and order of the holes H1, H2, and H3 may be configured such that occurrence of cracks in the bonding pad 31 and the test pad 32 during outer shape processing is substantially prevented and such that a sufficient contact area between the first conductive film 311 and the second conductive film 313 is ensured.

In embodiments, the bonding pad 31 or the test pad 32 may be provided with four or more kinds of holes.

The touch sensor is applicable to various kinds of display devices, for example, a liquid crystal display device or an organic electroluminescent (EL) display device.

The touch sensor according to an embodiment may prevent cracks in a conductive film, e.g., in a metal layer, of the pad unit during outer shape processing. In embodiments, pads of the touch sensor according to an embodiment may have low contact resistance.

While example embodiments have been described, various changes and modifications may be made without departing from the spirit and scope set forth in the following claims.

What is claimed is:
1. A touch sensor comprising:
a substrate;
a touch input unit disposed on the substrate and including a plurality of sensing electrodes for sensing user touch;
a plurality of wires; and
a pad unit including a plurality of pads electrically connected to the sensing electrodes through the wires,
wherein the pads include a first pad,
wherein the first pad comprises a first conductive layer disposed on the substrate, an insulating layer disposed on the first conductive layer, and a second conductive layer disposed on the insulating layer,
wherein the first conductive layer is disposed between the substrate and the insulating layer in a direction perpendicular to the substrate,
wherein the insulating layer includes a plurality of first-type holes and a plurality of second-type holes,
wherein each first-type hole of the first-type holes is smaller than each second-type hole of the second-type holes,
wherein the first-type holes completely expose first-type surface portions of the first conductive layer,
wherein the second-type holes completely expose second-type surface portions of the first conductive layer, and wherein the first-type surface portions of the first conductive layer are coplanar with the second-type surface portions of the first conductive layer in a plane parallel to the substrate.

2. The touch sensor of claim 1, wherein a minimum distance between the plurality of first-type holes and the plurality of sensing electrodes is greater than a minimum distance between the plurality of second-type holes and the plurality of sensing electrodes.

3. The touch sensor of claim 2, wherein a size of each second-type hole is at least twice a size of each first-type hole.

4. The touch sensor of claim 2, wherein the insulating layer further includes a plurality of third-type holes provided between the plurality of first-type holes and the plurality of second-type holes, and
wherein a size of each third-type hole of the third-type holes is unequal to a size of each first-type hole and is unequal to a size of each second-type hole.

5. The touch sensor of claim 4, wherein each third-type hole is larger than each first-type hole and smaller than each second-type hole.

6. The touch sensor of claim 1, wherein the first-type holes and the second-type holes have at least one of a polygonal shape, a circular shape, and an elliptical shape.

7. The touch sensor of claim 1, wherein the first conductive layer is a metal layer, and wherein the second conductive layer is a transparent conductive layer.

8. A touch sensor comprising:
a substrate;
a touch input unit disposed on the substrate and including a plurality of sensing electrodes for sensing user touch;
a plurality of wires; and
a pad unit including a plurality of pads electrically connected to the sensing electrodes through the wires,
wherein the pads include a first pad,
wherein the first pad comprises a metal conductive layer disposed on the substrate, an insulating layer disposed on the metal conductive layer, and a transparent conductive layer disposed on the insulating layer,
wherein the metal conductive layer is disposed between the substrate and the insulating layer in a direction perpendicular to the substrate,
wherein the insulating layer includes a first-type hole and a second-type hole,
wherein the first-type hole is smaller than the second-type hole in a plan view of the touch sensor,
wherein a minimum distance between the first-type hole and the plurality of sensing electrodes is greater than a minimum distance between the second-type hole and the plurality of sensing electrodes, and
wherein the first-type hole and the second-type hole respectively completely expose two portions of a same continuous flat face of the metal conductive layer that are coplanar with each other in a plane parallel to the substrate.

9. The touch sensor of claim 8, wherein the insulating layer further includes a third-type hole provided between the first-type hole and the second-type hole, and
wherein a size of the third-type is unequal to a size of the first-type hole and is unequal to a size of the second-type hole.

10. The touch sensor of claim 9, wherein the third-type hole is larger than the first-type hole and smaller than the second-type hole in the plan view of the touch sensor.

11. The touch sensor of claim 1, wherein two opposite edges of the first-type hole are respectively parallel to and respectively shorter than two opposite edges of the second-type hole in a plan view of the touch sensor.

12. The touch sensor of claim 1, wherein the first-type hole is as wide as and shorter than the second-type hole in a plan view of the touch sensor.

13. A touch sensor comprising:
a substrate;
a touch input unit disposed on the substrate and including a plurality of sensing electrodes for sensing user touch;
a plurality of wires; and
a pad unit including a plurality of pads electrically connected to the sensing electrodes through the wires,
wherein the pads include a first pad,
wherein the first pad comprises a first conductive layer disposed on the substrate, an insulating layer disposed on the first conductive layer, and a second conductive layer disposed on the insulating layer,
wherein the first conductive layer is disposed between the substrate and the insulating layer in a direction perpendicular to the substrate,
wherein the insulating layer includes a first-type hole and a second-type hole larger than the first-type hole, and
wherein two sections of the second conductive layer are respectively positioned in the first-type hole and the second-type hole and respectively directly contact two portions of a same continuous flat face of the first conductive layer that are respectively completely exposed by the first-type hole and the second-type hole and coplanar with each other in a plane parallel to the substrate.

14. The touch sensor of claim 13, wherein a section of the second conductive layer is directly connected to each of the two sections of the second conductive layer and is positioned farther from the substrate than each of the two sections of the second conductive layer is, wherein the insulating layer is disposed between the first conductive layer and the second conductive layer, and wherein the second conductive layer is continuously disposed on the first conductive layer.

15. The touch sensor of claim 1, wherein the first-type surface portions of the first conductive layer and the second-type surface portions of the first conductive layer are equidistant from the substrate.

16. The touch sensor of claim 8, wherein the two portions of the same continuous flat face of the metal conductive layer are equidistant from the substrate.

17. The touch sensor of claim 13, wherein the two portions of the same continuous flat face of the first conductive layer are equidistant from the substrate.

* * * * *